(12) United States Patent
Yano et al.

(10) Patent No.: US 9,187,657 B2
(45) Date of Patent: *Nov. 17, 2015

(54) INK JET RECORDING METHOD, RECORDED MATERIAL, AND INK SET

(75) Inventors: Takeshi Yano, Shiojiri (JP); Tetsuya Aoyama, Shiojiri (JP); Yusuke Mizutaki, Shiojiri (JP); Shoki Kasahara, Shiojiri (JP)

(73) Assignee: Seiko Epson Corporation (JP)

( * ) Notice: Subject to any disclaimer, the term of this patent is extended or adjusted under 35 U.S.C. 154(b) by 412 days.

This patent is subject to a terminal disclaimer.

(21) Appl. No.: 13/462,156

(22) Filed: May 2, 2012

(65) Prior Publication Data

US 2012/0287200 A1    Nov. 15, 2012

(30) Foreign Application Priority Data

May 10, 2011   (JP) .................... 2011-105008

(51) Int. Cl.
| | |
|---|---|
| *B41J 2/015* | (2006.01) |
| *C09D 11/101* | (2014.01) |
| *B41J 11/00* | (2006.01) |
| *C09D 11/54* | (2014.01) |
| *B41J 2/21* | (2006.01) |
| *C09D 11/322* | (2014.01) |
| *C09D 11/40* | (2014.01) |

(52) U.S. Cl.
CPC ............ *C09D 11/101* (2013.01); *B41J 2/2114* (2013.01); *B41J 11/002* (2013.01); *B41J 11/0015* (2013.01); *C09D 11/322* (2013.01); *C09D 11/40* (2013.01); *C09D 11/54* (2013.01)

(58) Field of Classification Search
CPC .... C09D 11/101; C09D 11/322; C09D 11/36; C09D 11/40; C09D 11/54; B41J 2/155; B41J 2/2114; B41J 2/2107; B41J 11/0015; B41J 11/002; B41M 5/0011
USPC ................ 347/20, 37, 95–100, 102, 105; 106/31.13, 31.6, 31.9
See application file for complete search history.

(56) References Cited

U.S. PATENT DOCUMENTS

| | | |
|---|---|---|
| 4,880,465 A | 11/1989 | Loria et al. |
| 7,828,888 B2 | 11/2010 | Itano et al. |
| 2003/0076372 A1 | 4/2003 | Asakawa |
| 2005/0093952 A1 | 5/2005 | Hoshino |
| 2005/0235870 A1 | 10/2005 | Ishihara |
| 2007/0076069 A1* | 4/2007 | Edwards et al. .............. 347/100 |
| 2007/0296790 A1 | 12/2007 | Nakazawa et al. |
| 2008/0081116 A1 | 4/2008 | Makuta et al. |
| 2008/0182083 A1 | 7/2008 | Oyanagi et al. |
| 2008/0187680 A1 | 8/2008 | Kawakami et al. |
| 2008/0199631 A1 | 8/2008 | Makuta et al. |
| 2008/0213518 A1 | 9/2008 | Oyanagi et al. |
| 2008/0238998 A1* | 10/2008 | Nakazawa et al. .............. 347/42 |
| 2008/0239043 A1* | 10/2008 | Nakazawa .................... 347/102 |
| 2008/0250970 A1 | 10/2008 | Oyanagi et al. |
| 2010/0026751 A1 | 2/2010 | Oyanagi |
| 2010/0086690 A1 | 4/2010 | Aoki |
| 2010/0187805 A1* | 7/2010 | Sano et al. ....................... 283/72 |
| 2011/0234681 A1 | 9/2011 | Nakane |
| 2012/0038702 A1 | 2/2012 | Kagata et al. |
| 2012/0156449 A1 | 6/2012 | Tateishi et al. |
| 2013/0335495 A1 | 12/2013 | Umebayashi |
| 2015/0029258 A1 | 1/2015 | Oyanagi et al. |

FOREIGN PATENT DOCUMENTS

| | | |
|---|---|---|
| CN | 101637999 A | 2/2010 |
| JP | 2008-174712 | 7/2008 |
| JP | 2008-208332 A | 9/2008 |
| JP | 2008-221824 A | 9/2008 |
| JP | 2008-230216 A | 10/2008 |
| JP | 2008-239951 A | 10/2008 |
| JP | 2009-285854 A | 12/2009 |
| JP | 2010-173082 | 8/2010 |
| JP | 2011-020362 A | 2/2011 |
| JP | 2011-062946 A | 3/2011 |
| JP | 2012-179756 A | 9/2012 |
| WO | WO-2011-027842 A1 | 3/2011 |

* cited by examiner

*Primary Examiner* — Matthew Luu
*Assistant Examiner* — Rut Patel
(74) *Attorney, Agent, or Firm* — Harness, Dickey & Pierce, P.L.C.

(57) ABSTRACT

An ink set is used in one or more recording media selected from a non-ink-absorbing or low ink-absorbing medium, a medium having an arithmetic surface roughness Ra of 20 μm or more, fabric, and plain paper. The ink set contains a glitter ink which is recorded by an ink jet head and contains a glitter pigment and a polymerizable ink which contains an active energy ray polymerizable compound and does not substantially contain a coloring material.

10 Claims, No Drawings

INK JET RECORDING METHOD, RECORDED MATERIAL, AND INK SET

Priority is claimed under 35 U.S.C. §119 to Japanese Application No. 2011-105008 filed on May 10 2011, is hereby incorporated by reference in its entirety.

BACKGROUND

1. Technical Field

The present invention relates to an ink jet recording method, a recorded material, and an ink set.

2. Related Art

In recent years, there has been an increase in demand for recorded materials in which an image having glitter is formed on a recording surface. As a method for forming an image having glitter, recoding has been performed heretofore using, for example, a foil stamping method including preparing a recording medium having a recording surface with high flatness, and then pressing a metallic foil against the recording medium, a method including vacuum depositing metal or the like onto a plastic film having a smooth recording surface, a method including applying a glitter pigment ink to a recording medium, and further performing press processing, and the like.

As an ink containing a glitter pigment (hereinafter referred to as a glitter ink as appropriate) and an ink jet recording method, JP-A-2008-174712 discloses one in which solvents which slightly melt a base material which is a non-absorbing material are used for an ink composition. In the case of such solvents, it has been possible to obtain good glitter in polyvinyl chloride plastic as the non-absorbing material. However, when non-absorbing materials or materials having remarkably low absorbency, such as plastic, metal, and glass with extremely low solubility, are not provided with an ink receiving layer, a solvent and the like convect before the ink dries, so that the surface smoothness of the glitter pigment is lost, which causes problems, such as deterioration of gloss. Even in the case of absorbing materials, when a glitter pigment is recorded by an ink jet method on a recording medium whose surface smoothness is not sufficient, such as plain paper, or a pigment layer whose surface is not smooth and which contains a pigment having an average particle size (average particle size based on a volume, the same applies in the following description) of 200 μm or more, light is irregularly reflected due to insufficient smoothness of the glitter pigment, and therefore it has been difficult to obtain good glitter. When recording is performed on non-absorbing materials or materials having remarkably low absorbency, there has also been a problem in that the adhesiveness of the glitter pigment to the recording medium is not sufficient, so that good friction resistance is not obtained.

SUMMARY

An advantage of some aspects of the invention is to provide an ink set and an ink jet recording method capable of recording an image having excellent glitter and also excellent friction resistance (durability to friction) even on one or more recording media selected from a non-ink-absorbing or low ink-absorbing medium, a medium having an arithmetic surface roughness Ra of 20 μm or more, fabric, and plain paper, or a pigment layer containing a pigment having an average particle size of 200 nm or more and capable of increasing the print speed by the use of an active energy ray polymerization reaction in an image recording process and a recorded material on which an image having excellent glitter is recorded.

The invention can be realized as the following aspects or application examples in such a manner as to solve at least one of the above-described problems.

Application Example 1

An ink set according to this application example contains a polymerizable ink which is given to one or more recording media selected from a non-ink-absorbing or low ink-absorbing medium, a medium having an arithmetic surface roughness Ra of 20 μm or more, fabric, and plain paper and which contains an active energy ray polymerizable compound and does not substantially contain a coloring material and a glitter ink containing a glitter pigment which is discharged onto the polymerizable ink by an ink jet head.

Thus, an ink set capable of forming an image having excellent glitter can be provided.

Application Example 2

An ink set according to this application example contains a polymerizable ink which is given to a recording medium on which a pigment layer containing a pigment having an average particle size of 200 nm or more and which contains an active energy ray polymerizable compound and does not substantially contain a coloring material and a glitter ink containing a glitter pigment which is discharged onto the polymerizable ink by an ink jet head.

Thus, an ink set capable of forming an image having excellent glitter can be provided.

Application Example 3

In an ink set according to this application example, the glitter ink does not substantially contain the active energy ray polymerizable compound.

Thus, due to the fact that the active energy ray polymerizable compound is not contained in the glitter ink, the dispersion of the glitter pigment is stabilized, so that an image having more excellent glitter can be formed.

Application Example 4

In an ink set according to this application example, the polymerizable ink contains a polymerizable compound in a proportion of 5% by mass or more.

Thus, a polymerizable ink which performs good curing is obtained.

Application Example 5

An ink jet recording method according to this application example includes, in an ink jet recording method using the above-described ink set, a foundation layer formation process for giving the polymerizable ink to a portion on the recording medium where at least the glitter ink is recorded to thereby form a foundation layer, a glitter ink recording process for recording the glitter ink on the foundation layer, and an irradiation process which is performed before the glitter ink recording process and which irradiates the foundation layer with an active energy ray.

Thus, an ink jet recording method capable of forming an image having excellent glitter is provided, and further, by emitting an active energy ray after discharging the polymerizable ink, the foundation layer is formed before the polymerizable ink permeates in a recording medium with high absorbency, and therefore the ink dropwise addition amount can be reduced. Moreover, an increase in the print speed can also be achieved.

Application Example 6

An ink jet recording method according to this application example includes, in the above-described ink jet recording method, a foundation layer formation process for giving the polymerizable ink to a portion on the pigment layer where at least the glitter ink is recorded to thereby form a foundation layer, a glitter ink recording process for recording the glitter ink on the foundation layer, and an irradiation process which is performed before the glitter ink recording process and which irradiates the foundation layer with an active energy ray.

Thus, an ink jet recording method capable of forming an image having excellent glitter is provided, and further, by emitting an active energy ray after discharging the polymerizable ink, the foundation layer is formed before the polymerizable ink permeates in a recording medium with high absorbency, and therefore the ink dropwise addition amount can be reduced. Moreover, an increase in the print speed can also be achieved.

Application Example 7

According to an ink jet recording method according to this application example, the polymerizable ink is recorded by the ink jet head.

Thus, the polymerizable ink can form the foundation layer at an arbitrary portion by the ink jet head and the used amount of the polymerizable ink can be reduced, so that this application example is economically excellent.

Application Example 8

According to an ink jet recording method according to this application example, the discharge amount per unit area (mg/inch$^2$) of the polymerizable ink can be set to the discharge amount per unit area (mg/inch$^2$) of the glitter ink.

Thus, an image having more excellent glitter can be recorded.

Application Example 9

According to an ink jet recording method according to this application example, the amount of liquid droplets per drop (L/inch$^2$) of the polymerizable ink is equal to or larger than the amount of liquid droplets per drop (L/inch$^2$) of the glitter ink.

Thus, an image having more excellent glitter can be recorded.

Application Example 10

A recording device according to this application example is a recording device, which employs the above-described recording method, and the recording device has a platen provided at a position facing the ink jet head and supporting the recording medium and a scanning mechanism which causes at least either the ink jet head or the platen to scan, in which the number of times of causing the scanning mechanism to scan when recording the glitter ink is larger than the number of times of causing the scanning mechanism to scan when recording the polymerizable ink.

Thus, the quick-drying properties of the glitter ink can be increased by providing the platen. Moreover, by providing the scanning mechanism, an image can be formed by relative displacement of the ink jet head and the recording medium, so that the application range in the structure of the recording device increases. Furthermore, due to the fact that the number of times of causing the scanning mechanism to scan when recording the glitter ink is larger than the number of times of causing the scanning mechanism to scan when recording the polymerizable ink, an image having more excellent glitter can be recorded.

Application Example 11

A recorded material according to this application example is a recorded material recorded by the above-described recording method.

Thus, a recorded material on which an image having excellent glitter is recorded can be provided.

DESCRIPTION OF EXEMPLARY EMBODIMENTS

Ink Jet Recording Method

Suitable embodiments of an ink jet recording method of the invention are described.

An ink jet recording method according this embodiment includes discharging a glitter ink in which a glitter pigment is dispersed onto a non-ink-absorbing or low ink-absorbing recording medium, a recording medium having an arithmetic surface roughness Ra of 20 µm or more, fabric, plain paper, or a pigment layer containing a pigment having an average particle size of 200 nm or more using the above-described ink jet device to thereby manufacture a recorded material.

Specifically, the ink jet recording method according to this embodiment includes a foundation layer formation process for discharging a polymerizable ink containing an active energy ray polymerizable compound to a portion to which a glitter ink is discharged on a recording medium or a pigment layer using the above-described ink jet device to thereby form a foundation layer constituted by active energy ray polymerizable compound components, an irradiation process for irradiating the formed foundation layer with an active energy ray to cure the foundation layer, and a glitter ink recording process for discharging a glitter ink onto the cured foundation layer using the ink jet device to thereby obtain a recorded material.

1. Absorbency

In this description, the "non-ink-absorbing or low ink-absorbing recording medium" refers to a recording medium in which no ink receiving layer is provided or an ink receiving layer is not sufficient. More quantitatively, the non-ink-absorbing and low ink-absorbing recording medium refers to a recording medium in which the water absorption amount of a recording surface during the period of time from the start of the contact to 30 msec$^{1/2}$ according to the Bristow method is 10 mL/m$^2$ or lower. The Bristow method is the most popular method as methods for measuring the liquid absorption amount in a short time and is adopted also in the Japan Technical Association of the Pulp and Paper Industry (JAPAN TAPPI). The details of the test method are described in Standard No. 51 "Paper and paperboard—Liquid absorbency test method-Bristow method" of "JAPAN TAPPI Paper Pulp Test Method 2000".

2. Non-Ink-Absorbing Recording Medium

Mentioned as the non-ink-absorbing recording medium are, for example, a plastic film (medium) which has not been subjected to surface treatment for ink jet recording (i.e., substantially having no ink receiving layer), one in which plastic is applied onto or a plastic film is adhered onto a base material, such as paper, glass, metal, and the like. Mentioned as the plastic used herein are polyvinyl chloride, polyethylene terephthalate, polycarbonate, polystyrene, polyurethane, polyethylene, polypropylene, and the like.

3. Low Ink-Absorbing Recording Medium

Mentioned as the ink low ink-absorbing recording medium are coated paper, recording paper (printing paper), such as light-weight coated paper, art paper, coat paper, mat paper, cast paper, and the like.

The coated paper is paper whose surface is coated with a coating material so as to increase the aesthetic sense or the smoothness. The coating material is obtained by mixing a pigment, such as talc, pyrophyllite, clay (kaolin), titanium oxide, magnesium carbonate, and calcium carbonate, and an adhesive, such as starch. The coating material is applied using a machine referred to as a coater in a paper manufacturing process. Examples of the coater include an on-machine type in which paper making and coating are performed in one process by directly connecting a paper machine and an off-machine type in which a coating process is provided separately from a paper making process. The coater is mainly used for recording and is classified into a coated paper for printing in "Statistical Classification of Production Dynamics" of the Japan Ministry of Economy, Trade and Industry.

The light-weight coated paper refers to a recording paper in which the coating amount of the coating material is 12 g/m$^2$ or lower. The art paper refers to a recording paper in which the coating material is applied with the coating amount of about 40 g/m$^2$ to a higher grade recording paper (high quality paper, paper in which the chemical pulp content is 100%). The coated paper refers to a recording paper to which the coating material is applied with a coating amount of about 20 g/m$^2$ or more and about 40 g/m$^2$ or lower. The cast paper refers to a recording paper manufactured in such a manner that the gloss or the recording effect of the art paper or the coated paper is further increased by applying pressure to the surface thereof by a machine referred to as a cast drum. In this description, the coating amount is the total value of the coating values of both surfaces of a recording paper.

4. Surface Roughness

In the invention, the arithmetic average roughness Ra of the surface to which the glitter ink is discharged of the recording medium is preferably 20 µm or more and more preferably 20 µm or more and 100 µm or lower.

The arithmetic average roughness (Ra) can be measured using, for example, a surface roughness meter or an optical interference type microscope. Mentioned as a specific surface roughness measuring device are a level difference/surface roughness/minute shape measuring device P-15 (manufactured by KLA-Tencor) and the like.

Mentioned as the recording medium having the rough surface are, for example, a high-quality paper "55PW8R", XeroxP (manufactured by Fuji Xerox Co., Ltd.; arithmetic average roughness Ra=29.2 µm), a plain/design paper black paper (manufactured by Tochiman Co. Ltd.; arithmetic average roughness Ra=30.2 µm), a superfine paper (manufactured by Seiko Epson Corp.; Ra=36.6 µm), a B-flute corrugated board sheet (manufactured by Rengo Corp.; arithmetic average roughness Ra=39.9 µm), and the like.

5. Fabric

Mentioned as the fabric for use in the invention are cotton, hemp, a rayon fiber, an acetate fiber, silk, wool, a nylon fiber, a polyester fiber, fabric containing a mixture of two or more kinds thereof, and the like.

6. Plain Paper

The plain paper is paper which is widely used for recording in an ink jet printer, a laser beam printer, a copy machine, and the like. For example, a paper indicated as "plain paper" as a trade name, a paper recognized as the name of "plain paper", and the like are mentioned. The plain paper is a paper which mainly contains cellulose fibers and the like and in which a "swelling layer" formed by resin, such as urethane resin, or a "gap layer" formed by inorganic particles, such as silica and alumina, is not substantially provided. Typical examples of the plain paper include a double-sided high-quality plain paper <recycled paper> (manufactured by Seiko Epson Corp.), XeroxP (manufactured by Fuji Xerox), Canon plain paper and white (manufactured by Canon, Inc.), Kassai plain paper finished paper (manufactured by FUJIFILM Corporation), BROTHER A4 high-quality plain paper (manufactured by BROTHER, Ltd.), KOKUYO KB paper (common paper) (manufactured by Kokuyo Co., Ltd.), and the like.

7. Pigment Layer

The pigment layer of the invention contains a pigment having an average particle size of 200 nm or more. The pigment layer may be formed by an ink jet method or the like or may be formed by an analog coater or the like described later. Thus, in the pigment layer containing a pigment with a larger average particle size, the surface is not smooth and good gloss is not obtained when recording a glitter ink. Moreover, the invention satisfactorily demonstrates the effects even when the above-described average particle size is large. The average particle size may be 250 nm or more or 300 nm or more. When a glitter ink is recorded on the pigment layer, a recording medium on which the pigment layer is formed is not particularly limited and a recording medium having high smoothness and high absorbency, such as Epson genuine photo paper <gloss> (manufactured by Seiko Epson Corp.) may be acceptable. The pigment may be any one of a known cyan pigment, a known magenta pigment, a known yellow pigment, a known black pigment, and the like and a white pigment is mentioned as a good example.

The white pigment is a pigment capable of recording a color referred to as "white" in light of common sense, for example, and also includes one which is slightly colored. Moreover, pigments are also included which constitute an ink referred to under the name of "white ink". Furthermore, a pigment is also included which constitute an ink in which when the ink is recorded on an Epson genuine photo paper <gloss> (manufactured by Seiko Epson Corp.), the brightness ($L^*$) and the chromaticity ($a^*$, $b^*$) of the ink are in the range of $70 \leq L^* \leq 100$, $-4.5 \leq a^* \leq 2$, and $-6 \leq b^* \leq 2.5$ as measured using a spectrophotometer Spectrolino (trade name, manufactured by GretagMacbeth) under the measurement conditions of Light source: D50, Observation view angle: 2°, Density: DIN NB, White reference: Abs, Filter: No, and Measurement mode: Reflectance.

Mentioned as the white pigment are, for example, metal oxide particles, such as titanium dioxide, zinc oxide, silica, alumina, magnesium oxide, and zirconium dioxide and particles having a hollow structure. Among the above, it is preferable to use titanium dioxide particles in which titanium dioxide is formed into powder from the viewpoint of excellent whiteness degree.

When using metal oxide particles, the average particle size d50 (based on volume) thereof is 280 nm or more and 440 nm or lower. Thus, it becomes possible to record a layer with a good whiteness degree.

As the titanium dioxide particles, commercially available one can be used. For example, ultrafine titanium oxide particle TTO series (manufactured by Ishihara Sangyo), fine titanium oxide particle (manufactured by TAYCA CORP.), NanoTek® Slurry (manufactured by C.I. Kasei, Co., Ltd.), and the like are mentioned.

The white pigment also includes particles having a hollow structure. The particles having a hollow structure are not particularly limited and known particles can be used. For example, the particles described in Specification of U.S. Pat. No. 4,880,465 and the like can be preferably used. As the particles having a hollow structure and containing organic compounds, commercially available one can also be used. Mentioned as a commercially available product are sx866 series (manufactured by JSR, Inc.) and the like.

Hereinafter, each process is described in detail.

Foundation Layer Formation Process

The foundation layer formation process is a process for giving the polymerizable ink described later in detail onto a predetermined recording medium or a pigment layer to thereby form the foundation layer.

In a former ink jet printing method, when a non-ink-absorbing recording medium or a recording medium having extremely low absorbency is not provided with an ink-receiving layer, a solvent and the like convect before the ink dries, so that the surface smoothness of the glitter pigment is lost, which causes problems, such as deterioration in gloss. Further, in a non-ink-absorbing recording medium or a recording medium having extremely low absorbency, there are problems in that the adhesiveness of the glitter pigment to the recording medium is not sufficient and good friction resistance (durability to friction) cannot be obtained. Furthermore, in a former ink jet printing method, in the case of a recording medium having an arithmetic surface roughness of 20 μm or more and a recording medium or a layer whose surface smoothness is not sufficient, such as fabric and plain paper, even when the glitter pigment is recorded by an ink jet method, the glitter pigment is not smoothly disposed, so that light is irregularly reflected. Accordingly, it has been difficult to obtain good glitter.

In contrast, this embodiment of the invention has a feature in that the foundation layer is formed using the polymerizable ink on a portion, to which at least the glitter ink is given, on a non-ink-absorbing or low-ink-absorbing recording medium, a recording medium having an arithmetic average roughness Ra of 20 μm or more, or a pigment layer containing a pigment having an average particle size of 200 μm or more, and the glitter ink is given onto the foundation layer. With such a feature, the foundation layer functions as an ink receiving layer and the solvent in the glitter ink permeates into the foundation layer, whereby the glitter pigment can be smoothly arranged on the recording medium. As a result, the glitter pigment is smoothly arranged, and thus high gloss (glitter) can be demonstrated. Moreover, by forming the foundation layer, the adhesiveness of the image formed with the glitter ink to the recording medium increases, so that the friction resistance (durability to friction) of a recorded material to be obtained can be particularly improved. The pigment layer is a layer to be provided to the completed recording medium, and layers of silica, alumina, and the like present on the surface layer of the recording medium are not contained.

In this embodiment, it is preferable that the polymerizable ink is provided using an ink jet head. Thus, it is possible to form the foundation layer at an arbitrary portion. Further, since it is possible to selectively form the foundation layer on a portion to which the glitter ink is provided and it is possible to reduce the used amount of the polymerizable ink, this embodiment is economically excellent. The duty, described later, of the polymerizable ink for use in the formation of the foundation layer is not particularly limited. The duty is preferably 50% or more, more preferably 80% or more, still more preferably 100% or more, and the most preferably 300% or more. Thus, it is possible to obtain excellent glitter (gloss) and high friction resistance.

The dropwise addition weight of the polymerizable ink is not particularly limited and is preferably 1 ng to 20 ng. The average film thickness of the foundation layer is preferably 0.1 μm or more and 30 μm or lower and more preferably 1 μm or more and 15 μm or lower. Thus, an image having more excellent glitter can be formed.

This embodiment describes the method including using the ink jet device as a method for giving the polymerizable ink. However, the invention is not limited thereto and known techniques can be selected. For example, the polymerizable ink may be given using analog coaters which have been used heretofore, such as a bar coater, a blade coater, a roll coater, a spray coater, and a slit coater. The analog coater has advantages in that the viscosity of the polymerizable ink is limited in a wide range and the polymerizable ink can be applied at a high speed. Examples of commercially available products of the analog coater include a K-hand coater (manufactured by Matsuo Sangyo Co., Ltd.), a bar coater (manufactured by Daiichi Rika Co., Ltd.), a Capillary_Coater for a small-size substrate and a small capacity type (manufactured by Hirano Tecseed Co., Ltd.), a No. 579 bar coater (manufactured by Yasuda Seiki Seisakusho Ltd.), and the like.

Irradiation Process

In addition to the foundation layer formation process, an irradiation process is provided. The irradiation process cures the foundation layer by irradiating the foundation layer formed as described above with an active energy ray. The active energy ray is not particularly limited insofar as it can apply energy capable of generating an initiation seed from a polymerization initiator through the irradiation. Examples of the active energy ray broadly include α-rays, γ-rays, X-rays, ultraviolet rays, visible rays, electron rays, and the like. Among the above, from the viewpoint of curing sensitivity and device availability, ultraviolet rays and electron rays are preferable as the active energy ray, and particularly ultraviolet rays are more preferable. By providing such a process, the function as an ink receiving layer of the foundation layer can be made more excellent, and the adhesiveness of the image to be formed to the recording medium can be further increased. As a result, a recorded material having more excellent friction resistance can be formed. Moreover, due to the fact that the function as an ink receiving layer of the foundation layer improves, the glitter pigment can be more smoothly arranged, so that higher gloss (glitter) can be demonstrated.

The irradiation process is preferably performed before the recording process described later but may be performed after performing the recording process. When the irradiation process which cures the foundation layer is performed before the recording process, the foundation layer is in the state of having a good smoothness degree, and therefore a recorded material with glitter is more preferably obtained.

In the irradiation process of the foundation layer, a metal halide lamp, a high-pressure mercury lamp, a Light Emitting Diode (LED), or the like can be used as the light source for emitting the active energy ray. The LED used as a preferable embodiment can easily change the irradiation energy by controlling the level of input power.

The irradiation source in the irradiation process of the foundation layer has the peak wavelength preferably in the range of 350 nm to 450 nm and more preferably in the range of 380 nm to 450 nm. When the LED has the peak wavelength in the above-mentioned ranges, an advantageous effect of a reduction in cost can be obtained.

The irradiation energy for curing is not limited and varies also depending on the ink composition. The ultraviolet lay emitting energy is preferably 10000 mJ/cm$^2$ or lower and more preferably 100 to 1000 mJ/cm$^2$.

Recording Process

In this process, liquid droplets of the glitter ink are discharged onto the foundation layer using the above-described ink jet device to be attached to the recording medium, thereby forming an image on the recording medium. Thus, a recorded material (recorded material of the embodiment of the invention) is obtained.

The film thickness of the image is preferably 0.02 to 10 µm and more preferably 0.05 to 5 µm. When the film thickness of a glitter layer is lower than 0.02 µm, the recording surface is not imparted with glitter in some cases.

Heating Process

The invention may have a heating process as appropriate. Heating methods are not particularly limited insofar as evaporation and scattering of a liquid medium present in the ink composition are promoted. Mentioned as methods for use in the heating process are a method including applying heat to a target recording medium, a method including spraying wind to the ink composition on a target recording medium, a method obtained by combining the methods, and the like. Specifically, forced air heating, radiation heating, conduction heating, high frequency drying, microwave drying, and the like are preferably used. The temperature range when giving heat in the heating process is not particularly limited insofar as evaporation and scattering of a liquid medium present in the ink composition can be promoted. When the temperature is 40° C. or more, the effect is obtained. The temperature is preferably in the range of 40° C. to 130° C. and more preferably in the range of 40° C. to 110° C. The "temperature" refers to the temperature of the surface of a recording medium which the ink composition contacts.

In the invention, when the heating process is provided, the glitter ink composition is preferably an aqueous ink or a solvent based ink substantially not containing an active energy ray polymerizable compound. When the glitter ink is an aqueous or a solvent based ink, the aqueous or solvent based ink is not dried, solidified, or cured even when the polymerizable ink is irradiated with an active energy ray. In this case, even in the case where the ink is absorbed in the polymerizable ink layer, the recording medium needs to be transported in a state where the glitter ink is not sufficiently dried, solidified, and cured in some cases when priority is given to the recording speed. Then, by providing the heating process, it becomes possible to compensate for drying, solidification, or curing, so that a more excellent recording device and a more excellent recording method are obtained.

Furthermore, when the heating process is provided, it is also preferable that the polymerizable ink is an aqueous polymerizable ink. A development of the aqueous polymerizable ink has been advanced from the environmental viewpoint in recent years. In the case of such an ink, good drying, solidification, and curing effects are not obtained only by the irradiation of an active energy ray in some cases. However, by providing the heating process, a more excellent recording device and a more excellent recording method can be provided.

Ink Jet Head

The ink jet head which discharges the ink composition may be a multipath system using a scanning mechanism which scans at least either the platen or the head or may be a line head system in which a recording medium is transported, the head is fixed, and then recording is performed and is preferably the multipath system. When forming a high resolution image, the resolution of the sub-scanning direction (paper feed direction) is governed by the transportation accuracy of the recording medium. In contrast, in the resolution of the main scanning direction (direction perpendicular to the paper feed direction), the resolution is governed by the nozzle sequence interval of the ink jet head. Therefore, the multipath system capable of scanning the ink jet head can form a higher resolution image.

When using the multipath system, the scanning mechanism may cause the ink jet head to scan or may cause the platen which is provided at the position facing the head and supports the recording medium to scan. It is preferable that the number of times of causing the scanning mechanism to scan when recording the glitter ink is larger than the number of times of causing the scanning mechanism to scan when recording the polymerizable ink. Thus, a recording method is obtained in which the polymerizable ink is recorded at a high speed and the glitter ink is more precisely recorded.

When the polymerizable ink and the glitter ink are discharged, it is preferable that the amount of liquid droplets (L/inch$^2$) to be discharged of the polymerizable ink is larger. Although the polymerizable ink merely functions as the foundation layer, the glitter ink is an ink for recording an image layer and needs to more precisely record than the polymerizable ink. More specifically, it is preferable that the amounts of liquid droplets of the inks establish a relationship such that the polymerizable ink is recorded at a high speed and the glitter ink is more precisely recorded.

Irrespective of the ink jet head type, i.e., the line head type or the multipath type, the resolution when recording the polymerizable ink and the resolution of a recorded image to be recorded on a recorded material of the polymerizable ink are not particularly limited and are preferably 360 dpi×360 dpi (main scanning×sub-scanning) or more. As an ink composition discharging system, known discharging methods for use in on-demand printers, such as a piezo system, a thermal jet system, and an electrostatic suction system, can be used.

Ink Set

Next, an ink set applied to the above-described ink jet printing method is described.

The ink set for ink jet printing according to this embodiment is an ink set for use in recording an image having glitter on the above-described specific recording medium using the ink jet printing device, and has at least the polymerizable ink and the glitter ink.

The ink set may have one or two or more of the above-described inks and an ink set may have one or two or more other inks. Mentioned as other inks which can be included in the ink set are color inks of cyan, magenta, yellow, light cyan, light magenta, dark yellow, red, green, blue, orange, violet, and the like, black ink, light black ink, and the like.

Polymerizable Ink

The polymerizable ink composition in this embodiment at least contains a polymerizable compound, such as an active energy ray polymerizable monomer, and a polymerization initiator and is cured by a polymerization reaction caused by the irradiation of energy rays. The polymerizable ink does not substantially contain a coloring material. As the coloring material, known dyes and pigments are mentioned and, for example, substances described in United States Patent Application No. 2010/0086690 and United States Patent Application No. 2005/0235870 are mentioned. The description of "does not substantially contain" means, for example, not containing the same in the ink in a proportion of 0.1% by mass or more, more preferably in a proportion of 0.05% by mass or more, still more preferably in a proportion of 0.01% by mass or more, yet still more preferably in a proportion of 0.005% by mass or more, and the most preferably in a proportion of 0.001% by mass or more. Hereinafter, each component constituting the ink composition is described in detail. The polymerizable ink may be an aqueous polymerizable ink containing 30% by mass or more of water and preferably 50% by mass or more of water.

Polymerizable Compound

The polymerizable compound for use in the ink composition is not particularly limited insofar as it is a compound which is polymerized and solidified by the action of an polymerization initiator described later when emitting energy lines, such as ultraviolet rays. Various kinds of monomers and oligomers having a monofunctional group and a polyfunctional group, such as two functional groups and three or more functional groups, can be used.

Mentioned as the monomers are, for example, unsaturated carboxylic acid, such as (meth)acrylic acid, itaconic acid, crotonic acid, isocrotonic acid, and maleic acid, or a salt or an ester thereof, urethane, amide, and an anhydride thereof, acrylonitrile, styrene, various kinds of unsaturated polyesters, unsaturated polyether, unsaturated polyamide, and unsaturated urethane. Mentioned as the oligomers are, for example, oligomers formed with the above-mentioned monomers, such as a straight chain acrylic oligomer, epoxy(meth)acrylate, aliphatic urethane(meth)acrylate, aromatic urethane (meth)acrylate, and polyester(meth)acrylate.

As other monofunctional monomers or polyfunctional monomers, an N-vinyl compound may be included. Mentioned as the N-vinyl compound are N-vinyl formamide, N-vinyl carbazole, N-vinyl acetamide, N-vinyl pyrrolidone, N-vinyl caprolactam, acryloyl morpholine, derivatives thereof, and the like.

Also among the substances mentioned above, an ester of (meth)acrylic acid, i.e., (meth)acrylate, is preferable.

Among the (meth)acrylates, mentioned as the monofunctional (meth)acrylates, are, for example, isoamyl(meth)acrylate, stearyl(meth)acrylate, lauryl(meth)acrylate, octyl(meth)acrylate, decyl(meth)acrylate, isomyristyl(meth)acrylate, isostearyl(meth)acrylate, 2-ethylhexyl-diglycol(meth)acrylate, 2-hydroxybutyl(meth)acrylate, butoxy ethyl(meth)acrylate, ethoxy diethylene glycol(meth)acrylate, methoxy diethylene glycol(meth)acrylate, methoxy polyethylene glycol (meth)acrylate, methoxy propylene glycol(meth)acrylate, phenoxyethyl(meth)acrylate, tetrahydrofurfuryl(meth)acrylate, isobornyl(meth)acrylate, 2-hydroxyethyl(meth)acrylate, 2-hydroxypropyl(meth)acrylate, 2-hydroxy-3-phenoxypropyl(meth)acrylate, lactone-modified flexible (meth)acrylate, t-butyl cyclohexyl(meth)acrylate, dicyclopentanyl (meth)acrylate, dicyclopentenyloxyethyl(meth)acrylate, and isobornyl(meth)acrylate.

Among the (meth)acrylates, mentioned as difunctional (meth)acrylates are, for example, triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanedioldi(meth)acrylate, 1,6-hexanedioldi(meth)acrylate, 1,9-nonanedioldi(meth)acrylate, neopentyl glycol di(meth)acrylate, dimethylol-tricyclo decane di(meth)acrylate, EO (ethylene oxide) adduct di(meth)acrylate of bisphenol A, PO (propylene oxide) adduct di(meth)acrylate of bisphenol A, hydroxypivalic acid neopentyl glycol di(meth)acrylate, and polytetramethylene glycol di(meth)acrylate.

Among the (meth)acrylates, mentioned as polyfunctional (meth)acrylates having three or more functional groups are, for example, trimethylol propane tri(meth)acrylate, EO-modified trimethylol propane tri(meth)acrylate, pentaerythritol tri(meth)acrylate, pentaerythritol tetra(meth)acrylate, dipentaerythritol hexa(meth)acrylate, di-trimethylol propane tetra(meth)acrylate, glycerin propoxy tri(meth)acrylate, caprolactone-modified trimethylol propane tri(meth)acrylate, pentaerythritol ethoxy tetra(meth)acrylate, and caprolactam-modified dipentaerythritol hexa(meth)acrylate.

Among the above, it is preferable to contain monofunctional (meth)acrylate as the polymerizable compound from the viewpoint that since the elongation property of a coating film when curing is high and the viscosity is low, ejection stability during ink jet recording is easy to be obtained. Furthermore, it is more preferable to use monofunctional (meth)acrylate and difunctional (meth)acrylate in combination from the viewpoint that the hardness of a coating film increases. The polymerizable compounds mentioned above may be used singly or in combination of two or more kinds thereof.

It is preferable for the monofunctional (meth)acrylate to have one or more kinds of skeletons selected from the group consisting of an aromatic ring skeleton, a saturated alicyclic skeleton, and an unsaturated alicyclic skeleton. Due to the fact that the polymerizable compound is a monofunctional (meth)acrylate having the skeleton mentioned above, the viscosity of an ink composition can be reduced.

Mentioned as monofunctional (meth)acrylate having an aromatic ring skeleton are, for example, phenoxy ethyl(meth)acrylate and 2-hydroxy-3-phenoxy propyl(meth)acrylate. Mentioned as monofunctional (meth)acrylate having a saturated alicyclic skeleton are, for example, isobornyl(meth)acrylate, t-butyl cyclohexyl(meth)acrylate, and dicyclopentanyl(meth)acrylate. Mentioned as monofunctional (meth)acrylate having an unsaturated alicyclic skeleton is, for example, dicyclopentenyloxyethyl(meth)acrylate.

The amount of the polymerizable compound in the polymerizable ink is preferably 5% by mass or more. In the case of an aqueous polymerizable ink, the amount thereof is preferably 5% by mass or more and 50% by mass or lower. In the case of a nonaqueous polymerizable ink, the polymerizable compound is contained preferably in a proportion of 50% by mass or more and more preferably in a proportion of 70% by mass or more. By satisfying these conditions, a good polymerizable ink is obtained.

Polymerization Initiator

The polymerization initiator contained in the ink composition is not limited insofar as it generates active species, such as a radical or a cation, by the energy of active energy rays, such as ultraviolet rays, and initiates the polymerization of the polymerizable compound. A radical polymerization initiator or a cationic polymerization initiator can be used, and particularly a radical photopolymerization initiator is preferably used.

Mentioned as the radical polymerization initiator are, for example, aromatic ketones, an acyl phosphine compound, an aromatic onium salt compound, an organic peroxide, a thio compound, a hexaarylbiimidazole compound, a ketoxime ester compound, a borate compound, an adinium compound, a metallocene compound, an active ester compound, a compound having a carbon-halogen bond, and an alkyl amine compound.

Mentioned as specific examples of the radical polymerization initiator are acetophenone, acetophenone benzyl ketal, 1-hydroxy cyclohexylphenyl ketone, 2,2-dimethoxy-2-phenyl acetophenone, xanthone, fluorenone, benzaldehyde, fluorene, anthraquinone, triphenylamine, carbazole, 3-methylacetophenone, 4-chlorobenzophenone, 4,4'-dimethoxy benzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropane-1-one, 2-hydroxy-2-methyl-1-phenylpropane-1-one, thioxanthone, diethyl thioxanthone, 2-isopropyl thioxanthone, 2-chlorothioxanthone, 2-methyl-1-[4-(methylthio) phenyl]-2-morpholino-propane-1-one, bis(2,4,6-trimethyl benzoyl)-phenyl phosphine oxide, 2,4,6-trimethyl benzoyl-diphenyl-phosphine oxide, 2,4-diethyl thioxanthone, and bis-(2,6-dimethoxy benzoyl)-2,4,4-trimethyl pentyl phosphine oxide.

Mentioned as a commercially available product of the radical polymerization initiator are, for example, IRGACURE 651 (2,2-dimethoxy-1,2-diphenylethane-1-on), IRGACURE 184 (1-hydroxy-cyclohexyl-phenyl-ketone), DAROCUR 1173 (2-hydroxy-2-methyl-1-phenyl-propane-1-on), IRGACURE 2959 (1-[4-(2-hydroxyethoxy)-phenyl]-2-hydroxy-2-methyl-1-propane-1-one), IRGACURE 127 (2-hydroxy-1-{4-[4-(2-hydroxy-2-methyl-propionyl)-benzyl]phenyl}-2-methyl-propane-1-one}, IRGACURE 907 (2-methyl-1-(4-methylthiophenyl)-2-morpholino propane-1-one), IRGACURE 369 (2-benzyl-2-dimethylamino-1-(4-morpholino phenyl)-butanone-1), IRGACURE 379 (2-(dimethylamino)-2-[(4-methyl phenyl)methyl]-1-[4-(4-morpholinyl) phenyl]-1-butanone), DAROCUR TPO (2,4,6-trimethyl benzoyl-diphenyl-phosphine oxide), IRGACURE 819 (bis(2, 4,6-trimethylbenzoyl)-phenyl phosphine oxide), IRGACURE 784 (bis(η5-2,4-cyclopentadiene-1-yl)-bis(2,6-difluoro-3-(1H-pyrrole-1-yl)-phenyl)titanium), IRGACURE OXE 01 (1.2-octanedione, 1-[4-(phenylthio)-, 2-(O-benzoyl oxime)]), IRGACURE OXE 02 (ethanone, 1-[9-ethyl-6-(2-methyl benzoyl)-9H-carbazole-3-yl]-, 1-(O-acetyloxime)), IRGACURE 754 (a mixture of oxyphenylacetic acid 2-[2-oxo-2-phenylacetoxyethoxy]ethyl ester and oxyphenylacetic acid 2-[2-hydroxyethoxy]ethyl ester (all manufactured by BASF A.G.), DETX-S (2,4-diethyl thioxanthone) (manufactured by Nippon Kayaku Co., Ltd.), Lucirin TPO, LR8893, LR8970 (all manufactured by BASF A.G.), Ubecryl P36 (manufactured by UCB), and the like.

The polymerization initiators may be used singly or in combination of two or more kinds thereof.

By the use of an active energy ray polymerizable compound as the polymerizable compound, the addition of the polymerization initiator can be omitted, but the initiation of the polymerization can be easily controlled by the use of the polymerization initiator, and therefore the use thereof is preferable.

Water, Solvent

The ink composition in this embodiment may contain water or an organic solvent.

Other Components

The ink composition in this embodiment may contain components other than the above-mentioned components. For example, a surfactant may be contained and a resin component and the like may be contained.

As the surfactant, polyester-modified silicone or polyether-modified silicone can be used as a silicone surfactant, for example, and polyether-modified polydimethyl siloxane or polyester-modified polydimethyl siloxane is particularly preferably used. As specific examples, BYK-347, BYK-348, BYK-UV3500, 3510, 3530, and 3570 (all are available from BYK Japan KK)) can be mentioned.

A polymerization inhibitor may be added. By adding a polymerization inhibitor, the storage stability of the ink composition improves. As the polymerization inhibitor, IRGASTAB UV-10 which is a hindered amine polymerization inhibitor, IRGASTAB UV-22 which is a hindered phenol polymerization inhibitor (all are available from Ciba Inc.), and the like can be used, for example.

The ink in this embodiment may contain a polymerization accelerator, a slipping agent, a permeation accelerator, a wetting agent (moisturizer), and other additive agents. Mentioned as other additive agents are, for example, a fixing agent, an antifungal agent, an antiseptic agent, an antioxidant agent, a UV absorber, a chelating agent, a pH adjuster, and a thickening agent.

Glitter Ink

The glitter ink may be either one containing a glitter pigment and water in a proportion of 50% by mass or more (aqueous ink) or one containing a glitter pigment and water in a proportion of lower than 50% by mass (nonaqueous ink). In the case of the nonaqueous ink, a solvent ink containing an organic solvent in a proportion of 50% by mass or more may be acceptable. Hereinafter, each component is described taking the case of the aqueous ink as an example. As the glitter pigment contained in the glitter ink, arbitrary substances can be used in the range where liquid droplets of the ink can be discharged by an ink jet recording method. When the glitter ink adheres onto a resin ink layer, the glitter pigment has a function of giving glitter and also can give glitter to an adhered substance. Mentioned as such a glitter pigment is a pearl pigment or a metal particle. Mentioned as a typical example of the pearl pigment are pigments having pearl gloss or interference gloss, such as titanium dioxide coated mica, a scale foil, and bismuth acid chloride. In contrast, as metal particles, particles of aluminum, silver, gold, platinum, nickel, chromium, tin, zinc, indium, titanium, copper, and the like, can be mentioned and at least one kind selected from a simple substance thereof, an alloy thereof, and a mixture thereof can be used.

As the glitter pigment for use in this embodiment, it is preferable to use silver from the viewpoint of the level of gloss (glitter) or aluminum from the viewpoint of cost. Hereinafter, the description is given using a silver ink as an example of the glitter ink.

1. Silver Particles

As described above, the silver ink according to this embodiment contains silver particles. Thus, due to the fact that the silver ink is one containing silver particles (particularly containing the same with a wax satisfying predetermined conditions), an image having excellent metallic glitter can be formed. Since silver is a metal with a high whiteness degree among various metals, various metal colors, such as gold color and copper color, can be expressed by superimposing other color inks.

The average particle size of the silver particles is preferably 5 nm or more and 100 nm or lower and more preferably 20 nm or more and 65 nm or lower. Thus, the glossy feeling (glitter) and the friction resistance of images to be formed using the silver ink can be particularly improved. The ejection stability (e.g., stability of impact position accuracy and discharge amount) of the ink by an ink jet method can be particularly improved, and an image of a desired image quality can be more certainly formed over a long period of time. In this description, the "average particle size" refers to an average particle size based on volume similarly as in the description above unless otherwise specified. The average particle size can be measured by a particle size distribution meter employing a laser diffraction scattering method as the measurement principle. As the laser diffraction type particle size distribution meter, a particle size distribution meter (e.g., "MICROTRACK UPA" manufactured by Nikkiso Co., Ltd.) employing a dynamic light scattering method as the measurement principle can be used, for example.

The content of the silver particles in the silver ink is preferably 0.5% by mass or more and 30% by mass or lower and more preferably 5.0% by mass or more and 15% by mass or lower. Thus, the ejection stability and the storage stability of the ink by an ink jet method can be particularly improved. Moreover, good image quality and friction resistance can be realized in a wide density range from a lower density to a higher density (content per unit area) of the silver particles on a recording medium when formed into a recorded material.

The silver particles may be one prepared by any method, and can be suitably formed by, for example, preparing a solution containing a silver ion, and reducing the silver ion.

2. Resin

The silver ink according to this embodiment of the invention may contain resin. By containing resin, fixability and friction resistance improves. Specific examples of the resin include polyacrylic acid, polymethacrylic acid, polymethacrylic acid ester, polyethyl acrylic acid, styrene-butadiene copolymer, polybutadiene, acrylonitrile-butadiene copolymer, chloroprene copolymer, fluorine resin, vinylidene fluoride, polyolefin resin, cellulose, styrene-acrylic acid copolymer, styrene-methacrylic acid copolymer, polystyrene, styrene-acrylamide copolymer, polyisobutyl acrylate, polyacrylonitrile, polyvinyl acetate, polyvinyl acetal, polyamide, rosin resin, polyethylene, polycarbonate, vinylidene chloride resin, cellulosic resin, such as cellulose acetate butyrate, vinyl acetate resin, ethylene-vinylacetate copolymer, vinylacetate-acryl copolymer, vinyl chloride resin, polyurethane, rosin ester, and the like. The resin is not limited to these examples.

3. Polymerizable Compound

The ink according to this embodiment of the invention may contain a polymerizable compound. More specifically, the glitter ink according to this embodiment of the invention may be an ink cured by active energy rays. With respect to the polymerizable compound, the same substances as those described in the section of "Polymerizable Ink (Polymerizable Compound)" can be used.

In contrast, it is preferable that the glitter ink does not substantially contain active energy ray polymerizable compounds. The description of "does not substantially contain" in this case means, for example, not containing the same in the ink in a proportion of 5% by mass or more, more preferably in a proportion of 1% by mass or more, still more preferably in a proportion of 0.1% by mass or more, yet still more preferably in a proportion of 0.01% by mass or more, and the most preferably in a proportion of 0.001% by mass or more. The glitter pigment has a problem in that the glitter pigment is hard to apply to the polymerizable ink as compared with color pigments, such as cyan and magenta pigments, which have been used heretofore. There is a good possibility that the problems are solved in the future and the invention is not limited to the glitter ink which does not substantially contain an active energy ray polymerizable compound. However, for example, a metal pigment described in U.S. Pat. No. 7,828,888 has a problem in that the metal pigment is oxidized in the polymerizable ink and is hard to demonstrate good gloss. Moreover, there is also a problem in that when the polymerizable compound is cured, the metal pigment is not favorably arranged, so that glitter is not favorably obtained. Considering the above circumstances, the combination of the polymerizable ink and the glitter ink which does not substantially contain an active energy ray polymerizable compound is favorable when applying the invention.

4. Polyvalent Alcohol

It is preferable for the ink according to this embodiment of the invention to contain polyvalent alcohol. When the ink according to this embodiment is applied to an ink jet printing device, the polyvalent alcohol can suppress the drying of the ink to thereby prevent the ink jet printing head portion from clogging.

Examples of the polyvalent alcohol include ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, trimethylolpropane, 1,2-butanediol, 1,2-pentanediol, 1,2-hexanediol, 1,2-heptanediol, 1,2-octanediol, 1,4-butanediol, 1,5-pentanediol, 1,6-hexanediol, and the like. Among the above, alkanediols having 4 to 8 carbon atoms are preferable and alkanediols having 6 to 8 carbon atoms are more preferable. Thus, it is possible to particularly increase permeability into the recording medium. The content ratio of the polyvalent alcohol in the ink is not particularly limited and is preferably 0.1% by mass or more and 20% by mass or lower and more preferably 0.5% by mass or more and 10% by mass or lower.

Among the polyvalent alcohols, the ink is preferably one containing 1,2-hexanediol and trimethylolpropane. Thus, it is possible to particularly improve the dispersion stability of the silver particles in the ink, it is possible to particularly improve the storage stability of the ink, and it is possible to particularly improve the discharge stability of the ink.

5. Glycol Ether

It is preferable for the ink according to the embodiment of the invention to contain glycol ether. Since the ink contains glycol ether, it is possible to increase the wettability to the target recording surface of the recording medium or the like to thereby increase the permeability of the ink.

Examples of glycol ether include lower alkyl ethers of polyvalent alcohols, such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, triethylene glycol monobutyl ether, and tripropyleneglycol monomethyl ether. When the triethylene glycol monobutyl ether among the above is used, it is possible to obtain favorable recording quality. The content ratio of the glycol ether in the ink is not particularly limited and is preferably 0.2% by mass or more and 20% by mass or lower and more preferably 0.3% by mass or more and 10% by mass or lower.

6. Surfactant

It is preferable for the ink according to the embodiment of the invention to contain an acetylene glycol surfactant or a polysiloxane surfactant. The acetylene glycol surfactant or the polysiloxane surfactant can increase the wettability to the target recording surface of the recording medium or the like to thereby increase the permeability of the ink.

Mentioned as the acetylene glycol surfactant are, for example, 2,4,7,9-tetramethyl-5-decyne-4,7-diol, 3,6-dimethyl-4-octyne-3,6-diol, 3,5-dimethyl-1-hexyne-3-ol, 2,4-dimethyl-5-hexyne-3-ol, and the like. Further, as the acetylene glycol surfactant, commercially available products can be used, and, for example, Olfin E1010, STG, Y (all manufactured by Nissin Chemical Industry CO., Ltd.) and Surfynol 104, 82, 465, 485, TG (all manufactured by Air Products and Chemicals Inc.) are mentioned.

As the polysiloxane surfactant, commercially available products can be used, and, for example, BYK-347, BYK-348 (manufactured by BYK Japan KK), and the like are mentioned.

The ink according the embodiment of the invention can further contain other surfactants, such as an anionic surfactant, a nonionic surfactant, or an amphoteric surfactant.

The content ratio of the surfactant in the ink is not particularly limited and is preferably 0.01% by mass or more and 5.0% by mass or lower and more preferably 0.1% by mass or more and 0.5% by mass or lower.

7. Other Components

The ink according to the embodiment of the invention may contain components (other components) other than the above-described components. Examples of the components include a pH adjuster, a penetrating agent, an organic binder, a urea compound, antidrying agents, such as alkanolamines (triethanolamine and the like), thiourea, and the like.

The invention is described above based on preferable embodiments but is not limited thereto.

Next, specific examples of the invention are described.

1. Preparation of Polymerizable Ink

A polymerizable ink was prepared by mixing a photopolymerization initiator, a polymerizable compound, a polymerization inhibitor, and a surfactant in such a manner as to have the composition shown in Table 1. As the polymerization inhibitor, IRGASTAB UV-22 (manufactured by Ciba) was used. As the surfactant, BYK-UV3500 (manufactured by BYK JapanKK) was used. The components used in Table 1 are as follows.

TABLE 1

|  |  | Clear ink |
| --- | --- | --- |
| Photopolymerization initiator | DETX-S | — |
|  | IRGACURE 819 | 4 |
|  | DAROCUR TPO | 4.8 |
| Polymerizable compound | N-vinyl caprolactam | 15 |
|  | Phenoxyethyl acrylate | 15 |
|  | Tripropylene glycol diacrylate | 59.1 |
| Polymerization inhibitor |  | 1.6 |
| Surfactant |  | 0.5 |
| Total |  | 100 |

2. Preparation of Glitter Ink

Polyvinyl pyrrolidone (PVP, polymerization average molecular weight 10000) was heated under the condition of 70° C. for 15 hours, and thereafter was cooled at room temperature. 1000 g of the PVP was added to 500 ml of an ethylene glycol solution to thereby prepare a PVP solution. 500 ml of ethylene glycol was put in another container, 128 g of silver nitrate was added thereto, and then the mixture was sufficiently stirred by an electronic stirrer to thereby prepare a silver nitrate solution. While stirring the PVP solution using an overhead mixer under the condition of 120° C., the silver nitrate solution was added thereto, and the solution was heated for about 80 minutes to thereby advance the reaction. Thereafter, the solution was cooled at room temperature. The obtained solution was subjected to centrifugal separation for 10 minutes under the condition of 2200 rpm by a centrifugal separator. Thereafter, the separated silver particles were extracted, and then added to 500 ml of an ethanol solution in order to remove the remaining PVP. Then, by further performing the centrifugal separation, the silver particles were extracted. Further, the extracted silver particles were dried by a vacuum drier under the condition of 35° C. and 1.3 Pa. To 10% by mass of the silver particles prepared as described above, 10% by mass of propylene glycol, 5% by mass of 1,2-hexanediol, 5% by mass of 2-pyrrolidone, 1% by mass of silicon surfactant (BYK-348), and ion-exchange water as the balance were added to thereby form a glitter ink.

3. Preparation of White Ink

A white ink was prepared using 10% by mass of titanium dioxide (volume average particle size of 330 nm) (NanoTek®_Slurry: manufactured by C.I. Kasei, Co., Ltd.), 2% by mass of a styrene acrylic acid copolymer, 5% by mass of 1,2-hexanediol, 10% by mass of glycerin, 0.9% by mass of triethanolamine, 0.5% by mass of BYK-348 (BYK-Chemie Japan K.K.), and ion exchange water as the balance.

4. Formation of Recorded Material

Examples 1 to 11

First, PX-G5000 (manufactured by Seiko Epson Corp.) was converted as an ink jet printer, and then an irradiation device (wavelength of 395 nm, UVLED) was attached thereto. Then, the polymerizable ink shown in Table 1 was recorded on the recording medium shown in Table 2 using the printer with a predetermined pattern of a predetermined duty. Then, the irradiation energy shown in Table 2 was emitted thereto. The irradiation process was performed with the irradiation energy shown in Table 2 with a 100% duty cycle. Thereafter, the glitter ink was recorded on the foundation layer with the polymerizable ink with the duty shown in Table 2. 200% duty refers to performing recording with 100% duty twice.

Example 12

In Example 12, the polymerizable ink shown in Table 1 was recorded on the recording medium shown in Table 2 using the printer described in the paragraph above with a predetermined pattern of a predetermined duty. Thereafter, the glitter ink was recorded with the duty shown in Table 2. Finally, the irradiation energy shown in Table 2 was emitted thereto. The irradiation process was performed with the irradiation energy shown in Table 2 with a 100% duty cycle.

Example 13

In Example 13, the white ink descried above was recorded with 100% duty on the recording medium shown in Table 2 using the printer described in the paragraph above. Thereafter, the polymerizable ink shown in Table 1 was recorded with a predetermined pattern of the duty shown in Table 2. Then, the irradiation energy shown in Table 2 was emitted thereto. The irradiation process was performed with the irradiation energy shown in Table 2 with a 100% duty cycle. Finally, the glitter ink was recorded with the duty shown in Table 2.

Comparative Examples 1 to 4

The glitter ink shown in Table 2 was given to the recording medium shown in Table 2 with a predetermined pattern of the duty (%) shown in Table 2 using the printer described in the paragraph above to thereby form an image.

Comparative Example 5

In Comparative Example 5, a recorded material was formed in the same manner as in Example 13, except not recording the polymerizable ink and not performing the irradiation process.

Comparative Example 6

In Comparative Example 6, a recorded material was formed in the same manner as in Example 13, except changing the average particle size of the pigment contained in the white ink used in Comparative Example 5 to 250 nm.

Here, the "duty" is a value calculated by the following expression.

duty (%)=Actual number of recorded dots/(Vertical resolution×Horizontal resolution)×100 (In the expression, the "actual number of recorded dots" is an actual number of recorded dots per unit area, and the "vertical resolution" and the "horizontal resolution" each are the resolution per unit length.)

C: Case where an improvement of friction resistance and a reduction in the adhesion of the glitter ink to the white cotton cloth were not observed.

These results were shown in Table 2.

As is clear from Table 2, the recorded materials obtained by the ink jet recording method of the invention, the gloss and the friction resistance were excellent but in Comparative Examples, satisfying results were not obtained.

TABLE 2

| | Type of recording medium | | Discharged amount of polymerizable ink [% duty] | Irradiation energy of polymerizable ink [mJ/cm$^2$] | Discharged amount of glitter ink [% duty] | 60° glossiness | Evaluation | Abrasion resistance of glitter ink |
|---|---|---|---|---|---|---|---|---|
| Example 1 | Plain paper | 55PW8R | 100 (=1.1 mg/inch$^2$) | 200 | 80 (=7 mg/inch$^2$) | 11 | D | A |
| Example 2 | | | 300 | 200 | 80 | 346 | B | A |
| Example 3 | Coated paper | NP coat | 100 | 200 | 80 | 381 | B | A |
| Example 4 | | | 100 | 300 | 80 | 394 | B | A |
| Example 5 | Cast paper | O mirror | 100 | 85.8 | 80 | 376 | B | B |
| Example 6 | | | 200 | 85.8 | 80 | 365 | B | B |
| Example 7 | | | 100 | 100 | 80 | 377 | B | B |
| Example 8 | | | 100 | 200 | 80 | 408 | A | A |
| Example 9 | | | 100 | 300 | 80 | 416 | A | A |
| Example 10 | Film (Synthetic paper PP) | YUPO80 | 100 | 200 | 80 | 414 | A | A |
| Example 11 | | | 100 | 300 | 80 | 411 | A | A |
| Example 12 | Plain paper | 55PW8R | 300 | 200 | 80 | 148 | C | A |
| Example 13 | | | 300 | 200 | 80 | 372 | B | A |
| Comparative Example 1 | Plain paper | 55PW8R | 0 | 0 | 80 | 5 | E | — |
| Comparative Example 2 | Coated paper | NP coat | 0 | 0 | 80 | 95 | D | — |
| Comparative Example 3 | Cast paper | O mirror | 0 | 0 | 80 | 287 | C | — |
| Comparative Example 4 | Film (Synthetic paper PP) | YUPO80 | 0 | 0 | 80 | 31 | D | — |
| Comparative Example 5 | Plain paper | 55PW8R | 0 | 0 | 80 | 72 | D | — |

5. Evaluation
5.1 Gloss

The gloss of the recording surface of the recorded materials according to Examples and Comparative Examples above was measured at the turning angle of 60° using a glossmeter (MINOLTA MULTI GLOSS 268), and the gloss was evaluated according to the following criteria.

A: 60° gloss of 400 or more
B: 60° gloss of 300 or more and lower than 400
C: 60° gloss of 100 or more and lower than 300
D: 60° gloss of 10 or more and lower than 100
E: 60° gloss of lower than 10

5.2 Friction Resistance Test

The recording surface of the recorded materials according to Examples and Comparative Examples was evaluated based on the following evaluation criteria.

The recorded material was set on a Gakushin-type abrasion tester AB-301 (trade name, manufactured by Tester Sangyo Co., Ltd.), and an abrading material (load: 300 g) of which the contact portion was provided with a white cotton cloth (according to JIS L 0803) was rubbed 10 times, whereby the abrasion resistance evaluation was performed, so that the abrasion resistance was evaluated based on the following criteria.

As compared with the case where the layer of the polymerizable ink was not given,
A: Case where an improvement of friction resistance and a reduction in the adhesion of the glitter ink to the white cotton cloth were observed,
B: Case where an improvement of friction resistance was observed but a reduction in the adhesion of the glitter ink to the white cotton cloth was not observed,

What is claimed is:

1. An ink jet recording method using an ink set that comprises a polymerizable ink which is given to one or more recording media selected from a non-ink-absorbing or low ink-absorbing medium, a medium having an arithmetic surface roughness Ra of 20 μm or more, fabric, and plain paper and which contains an active energy ray polymerizable compound and does not substantially contain a coloring material; and a glitter ink containing a metal or metal alloy glitter pigment which is discharged onto the polymerizable ink by an ink jet head, the recording method comprising:
    a foundation layer formation process for giving the polymerizable ink to a portion on the recording medium where at least the glitter ink is recorded to thereby form a foundation layer;
    a glitter ink recording process for recording the glitter ink on the foundation layer; and
    an irradiation process which is performed before the glitter ink recording process and which irradiates the foundation layer with an active energy ray,
    wherein the discharge amount per unit area (mg/inch$^2$) of the polymerizable ink is equal to or larger than the discharge amount per unit area (mg/inch$^2$) of the glitter ink.

2. The ink jet recording method according to claim 1, wherein the glitter ink does not substantially contain the active energy ray polymerizable compound.

3. The ink jet recording method according to claim 1, wherein the polymerizable ink contains a polymerizable compound in a proportion of 5% by mass or more.

4. The ink jet recording method according to claim 1, wherein the polymerizable ink is recorded by the ink jet head.

5. An ink jet recording method using an ink set that comprises a polymerizable ink which is given to one or more recording media selected from a non-ink-absorbing or low ink-absorbing medium, a medium having an arithmetic surface roughness Ra of 20 µm or more, fabric, and plain paper and which contains an active energy ray polymerizable compound and does not substantially contain a coloring material; and a glitter ink containing a metal or metal alloy glitter pigment which is discharged onto the polymerizable ink by an ink jet head, the recording method comprising:
   a foundation layer formation process for giving the polymerizable ink to a portion on the recording medium where at least the glitter ink is recorded to thereby form a foundation layer;
   a glitter ink recording process for recording the glitter ink on the foundation layer; and
   an irradiation process which is performed before the glitter ink recording process and which irradiates the foundation layer with an active energy ray,
   wherein the amount of liquid droplets per drop (L/inch$^2$) of the polymerizable ink is equal to or larger than the amount of liquid droplets per drop (L/inch$^2$) of the glitter ink.

6. A recording device, which employs a recording method that uses an ink set that comprises a polymerizable ink which is given to one or more recording media selected from a non-ink-absorbing or low ink-absorbing medium, a medium having an arithmetic surface roughness Ra of 20 µm or more, fabric, and plain paper and which contains an active energy ray polymerizable compound and does not substantially contain a coloring material; and a glitter ink containing a metal or metal alloy glitter pigment which is discharged onto the polymerizable ink by an ink jet head, wherein the recording method comprises a foundation layer formation process for giving the polymerizable ink to a portion on the recording medium where at least the glitter ink is recorded to thereby form a foundation layer; a glitter ink recording process for recording the glitter ink on the foundation layer; and an irradiation process which is performed before the glitter ink recording process and which irradiates the foundation layer with an active energy ray, the recording device, comprising:
   a platen provided at a position facing the ink jet head and supporting the recording medium; and
   a scanning mechanism which causes at least either the ink jet head or the platen to scan,
   the number of times of causing the scanning mechanism to scan when recording the glitter ink being larger than the number of times of causing the scanning mechanism to scan when recording the polymerizable ink.

7. A recording device, which employs a recording method that uses an ink set that comprises a polymerizable ink which is given to one or more recording media selected from a non-ink-absorbing or low ink-absorbing medium, a medium having an arithmetic surface roughness Ra of 20 µm or more, fabric, and plain paper and which contains an active energy ray polymerizable compound and does not substantially contain a coloring material; and a glitter ink containing a metal or metal alloy glitter pigment which is discharged onto the polymerizable ink by an ink jet head, wherein the recording method comprises a foundation layer formation process of recording the polymerizable ink to a portion on the recording medium by the ink jet head where at least the glitter ink is recorded to thereby form a foundation layer; a glitter ink recording process for recording the glitter ink on the foundation layer; and an irradiation process which is performed before the glitter ink recording process and which irradiates the foundation layer with an active energy ray, the recording device comprising:
   a platen provided at a position facing the ink jet head and supporting the recording medium; and
   a scanning mechanism which causes at least either the ink jet head or the platen to scan,
   the number of times of causing the scanning mechanism to scan when recording the glitter ink being larger than the number of times of causing the scanning mechanism to scan when recording the polymerizable ink.

8. A recording device, which employs a recording method that uses an ink set that comprises a polymerizable ink which is given to one or more recording media selected from a non-ink-absorbing or low ink-absorbing medium, a medium having an arithmetic surface roughness Ra of 20 µm or more, fabric, and plain paper and which contains an active energy ray polymerizable compound and does not substantially contain a coloring material; and a glitter ink contain a metal or metal alloy glitter pigment which is discharged onto the polymerizable ink by an ink jet head, wherein the recording method comprises a foundation layer formation process for giving the polymerizable ink to a portion on the recording medium where at least the glitter ink is recording to thereby form a foundation layer; a glitter ink formation process for recording the glitter ink on the foundation layer; and an irradiation process which is performed before the glitter ink recording process and which irradiates the foundation layer with an active energy ray, the recording device comprising:
   a platen provided at a position facing the ink jet head and supporting the recording medium; and
   a scanning mechanism which causes at least either the ink jet head or the platen to scan,
   the number of times of causing the scanning mechanism to scan when recording the glitter ink being larger than the number of times of causing the scanning mechanism to scan when recording the polymerizable ink.

9. A recording device, which employs a recording method that uses an ink set that comprises a polymerizable ink which is given to one or more recording media selected from a non-ink-absorbing or low ink-absorbing medium, a medium having an arithmetic surface roughness Ra of 20 µm or more, fabric, and plain paper and which contains an active energy ray polymerizable compound and does not substantially contain a coloring material; and a glitter ink contain a metal or metal alloy glitter pigment which is discharged onto the polymerizable ink by an ink jet head, wherein the recording method comprises a foundation layer formation process for giving the polymerizable ink to a portion on the recording medium where at least the glitter ink is recording to thereby form a foundation layer; a glitter ink recording process for recording the glitter ink on the foundation layer; and an irradiation process which is performed before the glitter ink recording process and which irradiates the foundation layer with an active energy ray, the amount of liquid droplets per drop (L/inch$^2$) of the polymerizable ink being equal to or larger than the amount of liquid droplets per drop (L/inch$^2$) of the glitter ink, the recording device comprising:
   a platen provided at a position facing the ink jet head and supporting the recording medium; and
   a scanning mechanism which causes at least either the ink jet head or the platen to scan,
   the number of times of causing the scanning mechanism to scan when recording the glitter ink being larger than the number of times of causing the scanning mechanism to scan when recording the polymerizable ink.

10. A recorded material, recorded by a recording method that uses an ink set that comprises a polymerizable ink which is given to one or more recording media selected from a non-ink-absorbing or low ink-absorbing medium, a medium having an arithmetic surface roughness Ra of 20 μm or more, fabric, and plain paper and which contains an active energy ray polymerizable compound and does not substantially contain a coloring material; and a glitter ink containing a metal or metal alloy glitter pigment which is discharged onto the polymerizable ink by an ink jet head, wherein the recording method comprises a foundation layer formation process for giving the polymerizable ink to a portion on the recording medium where at least the glitter ink is recording to thereby form a foundation layer; a glitter ink recording process for recording the glitter ink on the foundation layer; and an irradiation process which is performed before the glitter ink recording process and which irradiates the foundation layer with an active energy ray, the discharge amount per unit area (mg/inch$^2$) of the polymerizable ink being equal to or larger than the discharge amount per unit area (mg/inch$^2$) of the glitter rink.

* * * * *